United States Patent [19]

Katahara et al.

[11] Patent Number: 4,899,844
[45] Date of Patent: Feb. 13, 1990

[54] ACOUSTICAL WELL LOGGING METHOD AND APPARATUS

[75] Inventors: Keith W. Katahara, Allen; Billy Joe Smith, Richardson, both of Tex.

[73] Assignee: Atlantic Richfield Company, Los Angeles, Calif.

[21] Appl. No.: 300,010

[22] Filed: Jan. 23, 1989

[51] Int. Cl.⁴ ............................................. G01V 1/40
[52] U.S. Cl. .................................... 181/106; 367/25; 367/911
[58] Field of Search ........................ 181/104, 106, 111; 367/25, 32, 31, 911, 23

[56] References Cited

U.S. PATENT DOCUMENTS

| | | |
|---|---|---|
| 3,363,118 | 1/1968 | Sims . |
| 3,593,255 | 7/1971 | White . |
| 3,786,894 | 1/1974 | Lebreton ............................ 181/104 |
| 4,004,267 | 1/1977 | Mayne ................................. 367/41 |
| 4,415,998 | 11/1983 | Blizard ................................. 367/25 |
| 4,649,525 | 3/1987 | Angona et al. .................... 367/31 |
| 4,649,526 | 3/1987 | Winbow et al. .................... 367/35 |
| 4,682,308 | 7/1987 | Chung ................................. 367/31 |
| 4,700,100 | 10/1987 | Congdon ............................ 310/332 |
| 4,700,803 | 10/1982 | Mallett et al. ..................... 181/106 |
| 4,715,019 | 12/1987 | Medlin et al. ..................... 367/31 |
| 4,718,046 | 1/1988 | Medlin ................................ 367/31 |

FOREIGN PATENT DOCUMENTS 264323 4/1988 European Pat. Off. .
2224377 2/1984 United Kingdom .

OTHER PUBLICATIONS

"A Theoretical Study of Acoustic S-Wave and P-Wave Velocity Logging," Winbow G. A., *Geophysics*, vol. 53, #10, Oct. '88.

"Continuous Acoustic Shear Wave Logging," Zemanek et al., Paper V, SPWLA 25th Symposium, Jun. 1984.

"New Ways to Make Shear Waves," *The Technical Review*, vol. 53, #3, pp. 12-13.

Primary Examiner—Thomas H. Tarcza
Assistant Examiner—Ian J. Lobo
Attorney, Agent, or Firm—F. Lindsey Scott; Drude Faulconer

[57] ABSTRACT

A method and tool for acoustically logging a wellbore where a transmitter simultaneously generates a plurality of separate acoustical signals having different frequencies, each effectively centered about a different resonance frequency, and then transmits the signals as a composite multi-frequency output signal having an effective broad frequency bandwidth that is capable of exciting pressure waves in a variety of different types of earthen formations.

17 Claims, 3 Drawing Sheets

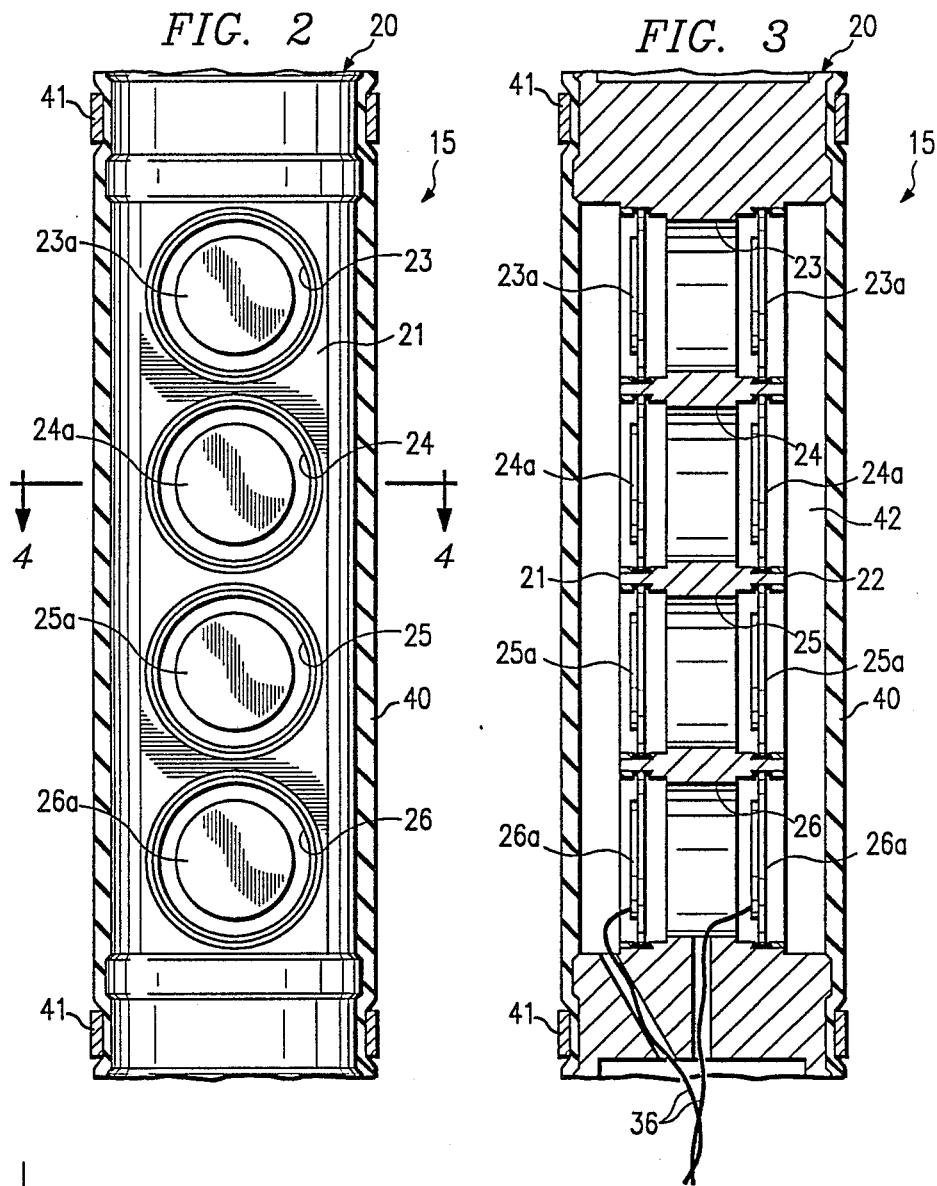
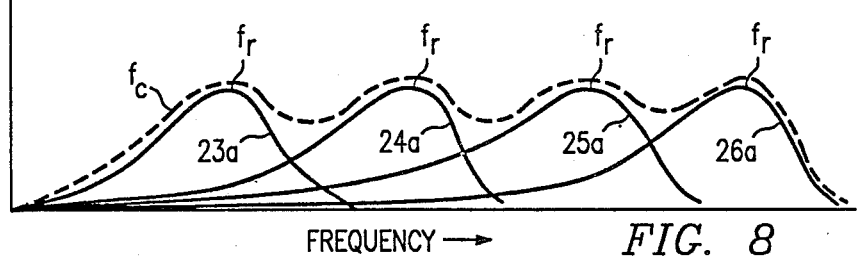

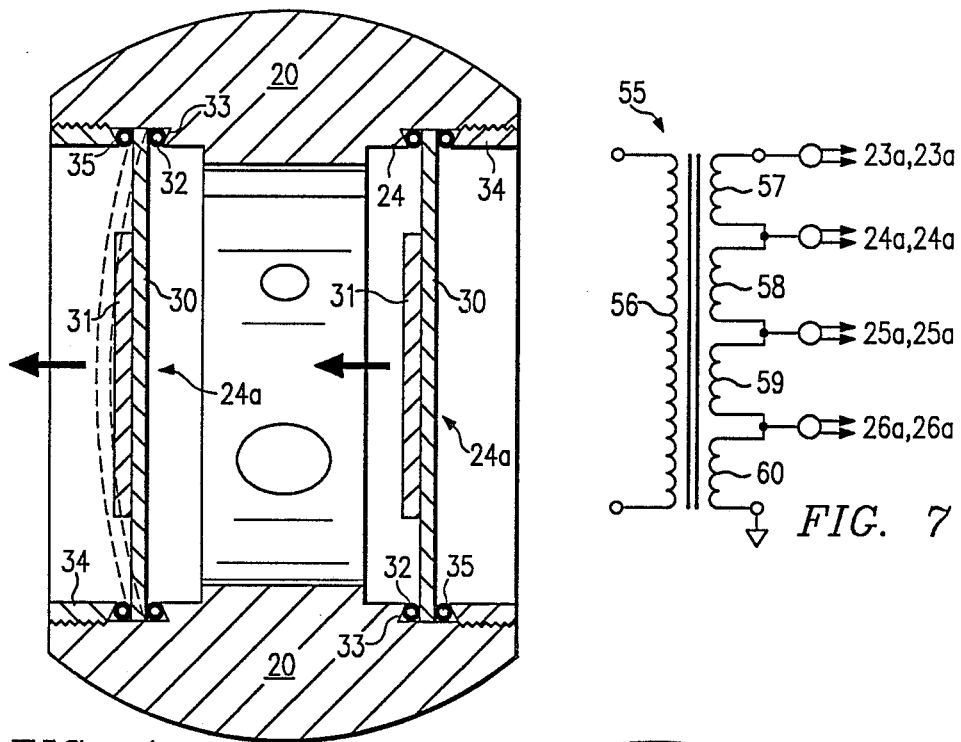
FIG. 4a
FIG. 7
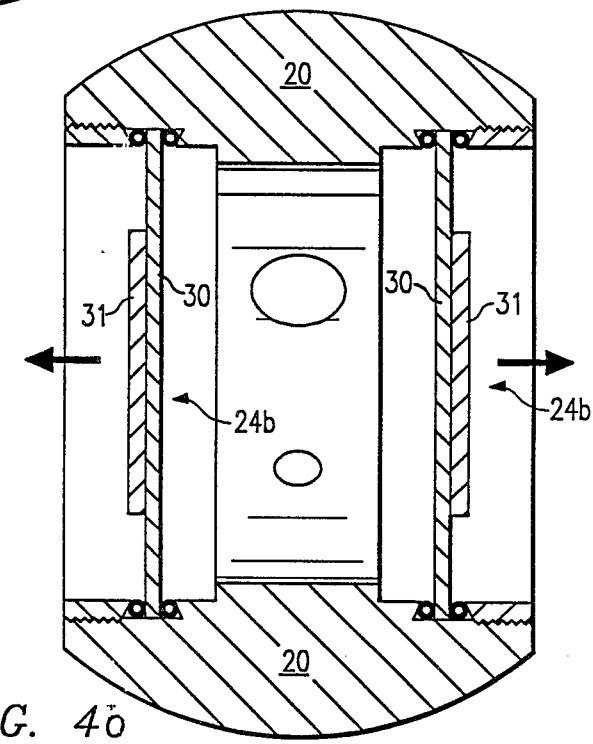
FIG. 4b

ACOUSTICAL WELL LOGGING METHOD AND APPARATUS

DESCRIPTION

1. Technical Field

The present invention relates to a method and apparatus for acoustically logging a wellbore and in one of its preferred aspects relates to acoustical logging wherein a plurality of separate transmitter elements, each having an individual resonance frequency, are simultaneously driven to generate a plurality of acoustical signals which, in turn, produce an acoustical output signal having a broad frequency bandwidth for exciting shear and/or compressional waves in a wide range of different formations traversed by the wellbore.

2. Background Art

There are several known tools available for acoustically logging a wellbore to gather information relating to certain characteristics (e.g., lithology, porosity, fluid, fracture gradient, etc.) of the various earthen formations traversed by the wellbore. A typical acoustic well logging tool is comprised of a sonde having an acoustical signal generator or transmitter and one or more spaced receivers mounted therein. The sonde is raised and lowered in the wellbore on a logging cable which also transmits information from the sonde to the surface.

The transmitter is pulsed in a timed sequence as the sonde is raised in the wellbore to generate acoustic signals which pass into the formation and are passed back into the wellbore where they are detected by the receivers in the sonde. The detected signals are then transmitted through the cable to the surface where they are processed and recorded to produce the desired acoustic log of the wellbore.

As is well known in the art, acoustic waves travel through a formation in both compressional (p-wave) and shear (s-wave) modes. In early acoustical logging operations, the shear wave often escaped detection because of severe attenuation in particular formations and because sometimes it was obscured by the tail of the compressional wave. Further, in soft or unconsolidated formations, it was impossible to detect any of the shear waves since they traveled outward into the formation rather than along the wall of the wellbore toward the receivers. Since shear waves provide valuable information about a formation, substantial efforts have been undertaken to develop tools which are capable of generating acoustic signals which, in turn, will excite detectable shear waves in a particular formation.

In order to excite shear waves which are free of interfering compressional waves in a formation, the wall of the wellbore needs to be vibrated only in a horizontal direction rather than in both vertical and horizontal directions. To achieve this desired vibration, early tools proposed mounting both the transmitter and receivers in a pad which, in turn, was pressed into physical contact with the wall of the wellbore, see U.S. Pat. No. 3,949,352. However, this approach required that the tool be stopped in the wellbore at each logging point and this, along with the difficulty of maintaining firm contact between the pad and the wall, seriously detracted from widespread use of such tools.

More recently, acoustic logging tools have been developed which excite shear waves in a formation by "indirect" vibration of the wellbore wall. Basically, a typical tool of this type centers the sonde in a wellbore which is normally filled with fluid, e.g., drilling mud. The transmitter is pulsed to generate an acoustical output signal which induces a pressure wave in the wellbore fluid which, in turn, vibrates the wellbore wall in a horizontal direction to excite shear waves in the formation; see U.S. Pat. Nos. 3,595,255; 4,649,525; 4,649,526; 4,682,308; and 4,718,046.

In such tools, the transmitter produces an asymmetrical or application of acoustical energy which has a defined frequency bandwidth, substantially centered about a particular resonance frequency, and which contains those frequencies which will excite shear waves in the particular formation under investigation. It is desirable that the effective frequency bandwidth of this output signal be as broad as possible since it has been found that shear waves are excited at different frequencies in different types of formations; i.e., high frequencies in hard formations and low frequencies in soft formations; see "Continuous Acoustic Shear Wave Logging", J. Zemanek et al; Paper U, SPWLA Twenty-Fifth Annual Logging Symposium, June, 1984; and "A Theoretical Study of Acoustic S-wave and P-wave Velocity Logging", G. A. Winbow, GEOPHYSICS, Oct. 1988, pp. 1334–1342.

Further, it has been found that varying diameters of the wellbore in relation to the fixed diameter of the sonde affects the frequencies needed to excite detectable shear waves in the same formation; i.e., direct shear waves have been estimated to propagate at frequencies ranging from a few hundred hertz (Hz) up to 1.2 kilohertz (kHz) in a 10 inch diameter wellbore for a formation having shear velocities in the range of about 1500 to 5000 feet/second. For a 6-inch diameter wellbore, the upper frequency limit increases to about 2 kHz for the same formation; see the Winbow article, supra. Thus, for a single element transmitter to excite shear waves in the many different types of formations and the varying wellbore diameters normally expected to be encountered in commercial acoustic logging operations, the transmitter element would have to be capable of generating a signal having an effective frequency bandwidth from a few hundred Hz to at least 2 kHz (about 3 octaves). Most single flexural disks or bender elements of the type now used in acoustic logging tools have only an effective bandwidth of about an octave, at best, and probably less in actual practice.

The desirability of generating acoustic signals having broad frequency bandwidths for acoustic well logging has been previously recognized. For example, U.S. Pat. No. 4,718,046 discloses an acoustic logging tool which has a transmitter comprised of a pair of bender elements, each of which, in turn, are comprised of a mosaic configuration of smaller individual blocks. By controlling the polarization of each individual block relative to its adjacent blocks, the bending action of the bender elements can be controlled to allow the elements to flex outward and inward together to produce a compressional and/or tube wave in the wellbore fluid. The bender elements are capable of producing acoustic energy over the frequency range between a few hundred Hz and several kHz when driven electrically by a continuous sweptfrequency sine wave. Such swept frequency operation requires complicated electronics for driving the transducer and complicated signal processing of the received signals.

DISCLOSURE OF INvENTION

The present invention provides an acoustic well logging method and tool which is capable of exciting detectable acoustic waves in a wide variety of formations. The tool has a single transmitter section that generates a composite acoustical output signal that has an effective broad frequency bandwidth. By generating a broad bandwidth signal having several effective frequency components, a single tool can be used to acoustically log a variety of different types of earthen formations which only acoustically respond to substantially different excitation or vibrational frequencies.

More specifically, the acoustic well logging tool of the present invention is comprised of a sonde that is lowered and raised on a logging communication cable. The sonde has a transmitter section and one or more receiver sections spaced below the transmitter. The transmitter includes a plurality of separate and individual acoustic signal generating means which are mounted in a housing. Each acoustic signal generating means is comprised of a pair of transducer elements (e.g., piezoelectric element mounted on a brass plate) which are mounted diametrically-opposed to each other at either end of a parallel, horizontal passage through the housing. The transducer elements can be positioned to generate asymmetrical signals for shear waves, or to generate symmetrical pulses for compressional waves. Both transducer elements of a pair have the same resonance frequency which is different from the resonance frequencies of other pairs.

An elastic sleeve is mounted on the housing over all of the transducer elements and forms a space therebetween which is filled with a liquid, e.g., oil, which, in turn, provides acoustical communication between each of the signal generating means and the sleeve. The sleeve serves as a means for transmitting the plurality of individual signals as a composite acoustical output signal into the wellbore liquid, e.g., drilling mud, which normally fills a wellbore. The sleeve also isolates the transducer elements both chemically and electrically from the drilling mud, and serves to dampen out the acoustic pressure wave. The output signal is transmitted through the wellbore liquid to vibrate the formation thereby exciting acoustic waves (either shear waves or compressional waves) in the formation.

The acoustic waves travel downward in the formation and return to the wellbore to create pressure waves in the wellbore liquid adjacent each of the receiver sections. Each receiver section is similar to the transmitter section in that each receiver section has a plurality of receiver elements mounted on a housing which match the number and the respective individual resonance frequencies of the individual acoustic signal generating means. An elastic sleeve is mounted on the housing and forms a space between the receiver elements and the sleeve which is filled with a liquid, e.g., oil.

The signals, returning from the formation, vibrate the sleeve thereby generating a corresponding signal in the tool cavity liquid which, in turn, is detected by the receiver elements. One or more of the receiver elements will predominantly respond to a particular frequency component in the returning signal depending upon the receiver element's resonance frequency. Each signal is relayed to the surface as it is received for processing and recording thereby forming the acoustic log of the wellbore.

BRIEF DESCRIPTION OF THE DRAWINGS

The actual construction, operation, and apparent advantages of the present invention will be better understood by referring to the drawings in which like numerals identify like parts and in which:

FIG. 2 is an enlarged, front elevational view of the transmitter section of the present tool;

FIG. 3 is a side view of the transmitter section of FIG. 2;

FIG. 4A is an enlarged cross-sectional view of a first embodiment of the transmitter taken along line 4—4 of FIG. 3 with the transducers elements of FIGS. 2 and 3 mounted to generate an asymmetrical wave for exciting shear waves in a formation;

FIG. 4B is a cross-sectional view, similar to FIG. 4A, with the transducers elements mounted to generate a monopole wave to excite compressional waves in a formation;

FIG. 7 is a schematic view of a transformer winding which may be used to pulse the present transmitter; and FIG. 8 is an idealized representation of spectra of wave forms centered about different resonance frequencies as generated by the individual elements of the present transmitter and a summation curve therefor.

BEST MODE FOR CARRYING OUT THE INvENTION

Figure 1:
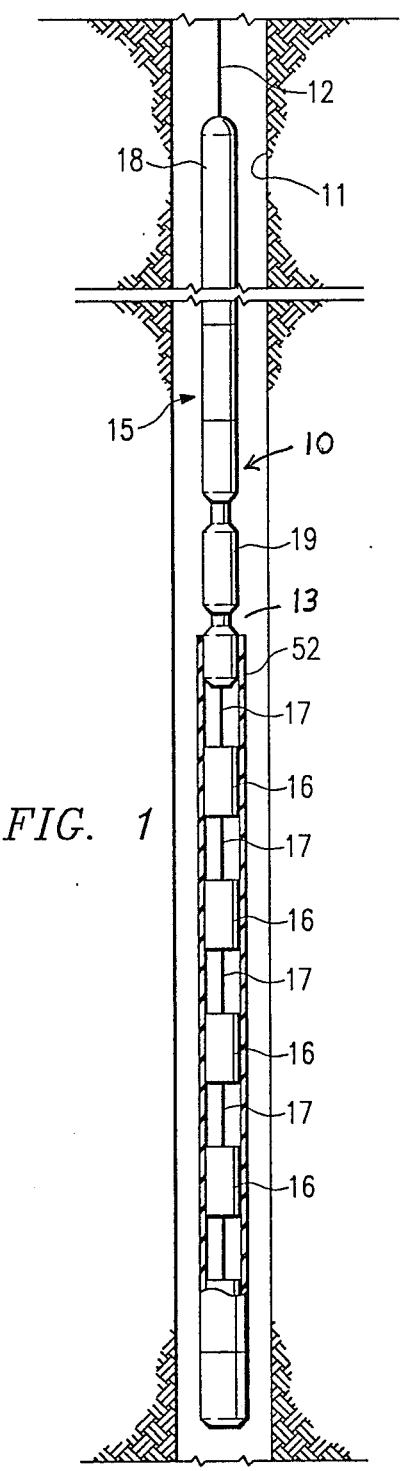
FIG. 1 is a perspective view, partly in section, of the present acoustical well logging tool suspended in a well bore.

Referring more particularly to the drawings, FIG. 1 illustrates present acoustic well logging tool 10 suspended in wellbore 11 on an armored logging cable 12 or the like. Wellbore 11 is filled with a substantially incompressible liquid 13, e.g., drilling mud. Tool 10 is comprised of a transmitter section 15 and one or more receiver sections 16 which are spaced at known, fixed distances below transmitter section 15 and, as shown, are supported by short lengths 17 of wire cable. The basic downhole electronics for driving transmitter section 15 are housed in electronic section 18 while additional electronics for detecting and relaying signals from receiver sections 16 are contained in other sections of tool 10, e.g., section 19. The details of the basic electronics which can be used to drive transmitter 16 and to amplify, record and process the signals from receivers 17 form no part of the present invention and may be any of those used with the transmitter and receivers of presently known acoustic well logging systems, e.g, U.S. Pat. Nos. 3,593,255; 4,649,525; 4,649,526.

As will be understood in the art, tool 10 is normally lowered into wellbore 11 and is then raised as transmitter 15 is pulsed or actuated to generate acoustical signals which generate corresponding pressure waves in wellbore liquid 13 which, in turn, excites compressional and/or shear waves in the formation adjacent the wellbore. The compressional and/or shear waves travel downward through the formation and are detected by receivers in receiver sections 16 which relay the detected signals to the surface where each is processed and recorded to formulate an acoustical log of the wellbore.

In accordance with the present invention, logging tool 10 provides (1) a means for generating an acoustical pressure wave in liquid 13 which contains a plurality of different, distinct frequency components, and (2) one or more receiver sections, each having a plurality of individual transducers, each of which, in turn, has a distinct resonance frequency matched to one of the frequency components in the composite acoustical pressure wave.

Referring now to FIGS. 2 and 3, transmitter section 15 is comprised of an elongated vertical housing 20 which is flattened on two sides to provide two, diametrically opposed faces 21, 22. The housing is preferably constructed of a dense material, such as brass, rather than a light material such as aluminum. A plurality of horizontal, individual parallel passages 23-26 (four shown) are provided through housing 20 which open through faces 21, 22. Passages 23-26 are shown in a vertically-spaced relationship but it should be understood that they could be arranged in other parallel patterns, e.g., side-by-side, if space permits. The height of the acoustically active area should not exceed half the wavelength of the slowest borehole acoustic wave that it is desirable to excite.

Each passage 23-26 is preferably cylindrical and, as shown, all are of equal size but, again, the diameters of the individual passages may vary if the situation dictates. Pairs of individual transducer elements, 23a-26a, are mounted in passages 23-26, respectively, as shown in FIG. 4A. Each transducer 23a-26a is of the same basic construction in that each comprises a substrate (brass plate) 30 (FIG. 4A) having an areally slightly smaller piezoelectric or ferroelectric (e.g., lead-zirconate-titanate) element 31 bonded or otherwise secured thereto. Preferably, each piezoelectric or ferroelectric element 31 is circular and all are of the same diameter but each differs in thickness. That is, the thickness of element 31 of transducer 23a is of a different thickness than that of element 31 of transducer 24a and so on. By varying the thicknesses, the resonance frequency of a particular transducer element can be controlled, i.e., thick elements produce higher resonance frequencies than do thinner elements when driven in the same manner. Of course, the output acoustic spectrum of each transducer element may be controlled by other means, e.g., varying the diameter of the disks in the element; varying the volume of the passage between elements, or placing a constriction therein; exciting or driving the ferroelectric element with different voltages or different shaped pulses; using different types of elements (bender bars, bimorphs, etc.). When an electrical voltage from leads 36 (only two shown in FIG. 3) is applied across piezoelectric element 31, it expands or contracts radially depending on the polarity of the voltage. The passive metal substrate 30 elastically resists the radial motion of element 31 which causes the composite transducer to bow in or out, thereby generating a signal centered effectively about the resonance frequency of the transducer.

The transmitter transducer disks should preferably have the maximum diameter allowed by space constraints. The desirability of maximizing the diameter for a given resonance frequency is well known from sonar applications: see Theory of the Piezoelectric Flexural Disk Transducer with Applications to Underwater Sound, R. S. Woolett, U.S. Navy Underwater Sound Laboratory Research Report No. 490, New London, 1960.

To allow maximum displacement of a transducer, and hence, a more powerful and effective signal, each transducer element is mounted to allow maximum flexure of the surface area of the transducer element from its circumference to the center thereof. That is, if the edges of the transducer are rigidly secured, only the central portion of the transducer can flex when excited. In accordance with the present invention, each transducer is mounted so that the circumferential edge of circular substrate 30 can rotate about an imaginary circumferential axis when element 31 is excited thereby allowing substantially the whole surface area of the transducer to bow out or in (see dotted lines in FIG. 4A only). More specifically, the diameter of each passage 23-26 is reduced to provide a shoulder 33 near each end of the passage. Each shoulder 33 is sloped away from its respective passage to provide a sloped annular channel in which an annular support ring 32 is positioned. Preferably, ring 32 is formed from a metallic, hollow O-ring but it can be a solid wire ring or equivalent. Substrate 30 of a transducer element is positioned onto ring 32 and a keeper ring 34 or the like is threaded into passage 24. Keeper 34 has a sloped channel about its inner edge to receive a second ring of slightly resilient material 35, also preferably a hollow, metallic O-ring. The rings 32 and 35 contact only the metallic plate 30 and not the relatively fragile piezoelectric 31. It is for this reason that the metal plate 30 has a larger diameter than the piezoelectric 31. It can be seen that while the transducer element is firmly held within its respective passage, substantially its entire surface is free to flex when element 31 is driven.

It is important that the circumference of the disk be firmly prevented from moving horizontally relative to the housing 20 because the purpose of the disk flexure is to displace fluid relative to the housing. The housing needs to be dense and massive relative to the fluid so that the reaction force on the housing produces relatively little displacement. The rings 32 and 35 should preferably not be made of a soft compliant material such as rubber because this would allow the outer edge of the disk to move horizontally in a direction opposite to the motion at the center of the disk, thereby decreasing the net fluid displacement.

As shown in FIG. 4, the transducers 24a are mounted to generate an asymmetrical acoustical wave which, in turn, will predominantly excite shear waves in a formation. That is, elements 31 of both transducers 24a are positioned to flex in the same direction (see arrows in FIG. 4A) when a voltage is simultaneously applied. While only transucers 24a are shown, it will be understood that all of the transducers 23a-26a will also be similarly mounted thereto.

The transducer elements in FIG. 4B are mounted to provide a symmetric wave which, in turn, will predominantly excite compressional waves in a formation. That is, the transducer elements will flex in opposite directions (see arrows in FIG. 4B) when elements 31 are simultaneously excited.

An elastic sleeve (e.g., rubber) 40 (FIGS. 2 and 3) is mounted on housing 20 and covers all of the transducers 23a-26a and is held in place by annular clamps 41 or the like. The space 42 between sleeve 41 and housing 20 is filled with an insulating liquid, e.g., oil, to provide acoustical communication between transducers 23a-26a and sleeve 40. The same oil also fills the passages 23-26 between transducer elements.

Figure 5:
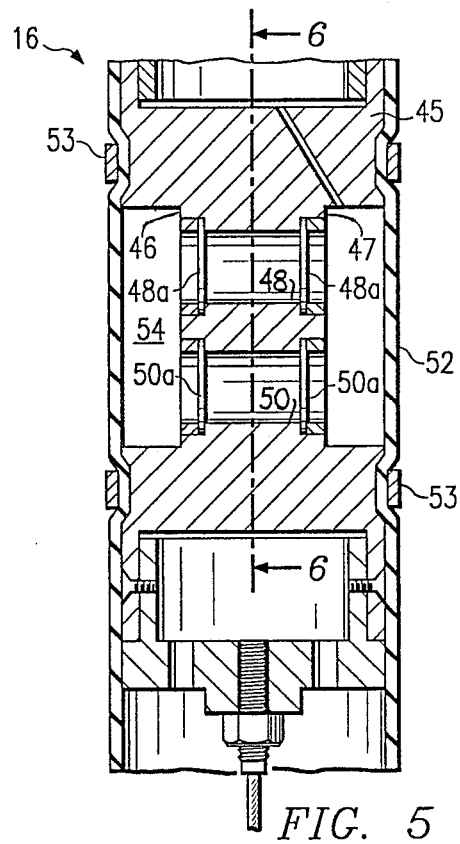
FIG. 5 is an enlarged cross-sectional view of the receiver section of the present tool.
Figure 6:
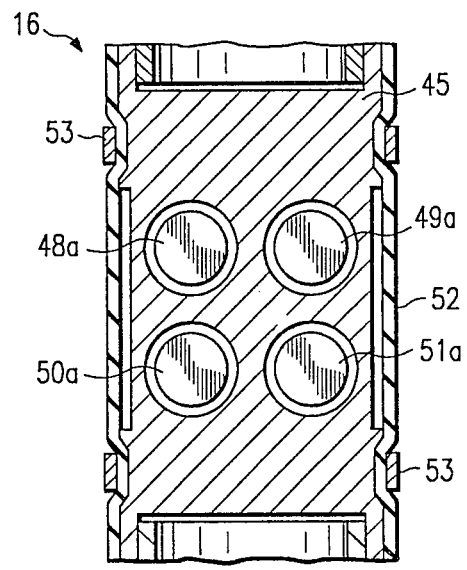
FIG. 6 is a cross-sectional view of the receiver section taken at line 6—6 of FIG. 5.

Each of receiver sections 16 is basically identical in construction so only one will be described in detail. Referring to FIGS. 5 and 6, receiver section 16 comprises a housing 45 having two diametrically opposed faces 46, 47. A plurality of horizontal, parallel passages 48–51 (number matches number of passages in transmitter 15) are provided in housing 45. Pairs of individual receiver transducers 48a–51a are mounted in passages 48–51, respectively, with the transducers of each pair having the same resonance frequency which, in turn, is matched to the resonance frequency of one of said pair of elements 23a–26a in transmitter section 15. That is, if the resonant frequencies of elements 23a–26a are 1 kHz, 2 kHz, 3 kHz and 4 kHz, respectively, then receiver elements 48a–51a will have resonance frequencies of 1 kHz, 2 kHz, 3 kHz, and 4 kHz, respectively. The receiving sensitivity of the disk elements does not depend very much on the disk diameter. Thus the receiver disk elements can be chosen to be smaller and the receiver housing 45 can be made more compact than the transmitter housing, 20.

An elastic sleeve 52 is mounted on housing 45 and over elements 48a–51a and is held in place by ring clamp 53 or the like. The space 54 and passages 48–51 between elements 48a–51a are filled with a liquid, e.g., oil, to provide acoustical communication between the sleeve and the receiver elements 48a–51a.

As stated above, the resonance frequency of a disk element can be determined by its thickness and/or area in that this frequency increases with its thickness and decreases with its area. However, the maximum voltage that can be applied to a particular piezoelectric element depends on its thickness, i.e., an element that is twice as thick as another can take twice as much voltage. Since it is often desirable to drive such transmitter element to its particular limit in the transmit mode, a means must be provided for simultaneously supplying the proper voltage to each pair of transmitter elements. One such means is transformer 55 (schematically illustrated in FIG. 7) which is to be mounted in the sonde of tool 10 and is comprised of a primary winding 56 and a plurality of secondary windings or taps 57–60 which correspond to the number of pairs of transmitter elements 23a–26a in transmitter section 15. As will be understood, primary winding 56 of transformer 55 is sequentially pulsed by a defined voltage which, in turn, supplies each of secondary windings 57–60 with a designed voltage which, in turn, drives each pair of elements 23a–26a, respectively, at their respective resonance frequencies.

Since each of the transducers, 23a–26a, is excited by the same electrical pulse, it is desirable that this pulse be a broad frequency band pulse. One way to do this is to use a broad frequency band, square wave pulse to excite each of the transducers.

Therefore, as each pair of transmitter elements (23a–26a for shear wave generation; 23b–26b for compressional wave generation) is driven by the desired voltage pulse, they generate a signal or pressure wave in the incompressible liquid in space 42 of transmitter section 15 which has a broad frequency bandwidth effectively centered about its respective resonance frequency ($f_r$); see FIG. 8. The vibrations emitted by the individual transducer elements superpose in the annular fluid, the rubber sleeve, and in the borehole fluid to form a composite output pressure wave $f_c$ (FIG. 8) which vibrates the formation and excites shear waves and/or compressional waves in the formation. The sleeve 40 serves to transmit and help sum the individual signals from each transducer element, and also serves to damp out the pressure wave. These waves travel down through the formation and return to the wellbore to generate pressure waves in wellbore liquid 13 as the waves pass each receiver section 16. Each of these returning pressure waves, in turn, vibrates sleeve 52 of a respective receiver section 16 thereby generating a signal in the liquid filling space 54 which contains a wide range of frequency components. Each receiver transducer 48a–51a detects the signal in liquid in space 54 and particularly responds to the frequency component corresponding to the resonance frequency of that receiver transducer. The detected signals are then relayed to the surface for processing, etc.

In designing the transmitter section 15 for tool 10, it is desirable for the transmitter to generate a composite output signal $f_c$ having as broad an effective frequency bandwidth as possible so that a single tool can generate an output acoustical signal which will excite shear waves and/or compressional waves (depending on transducer direction) in the wide variety of different formations, (i.e., both soft and hard), which are normally expected to be encountered during a typical logging operation. In most cases, this will require an effective frequency bandwidth of from a few hundred Hz to several kHz, e.g., (100 Hz–5 kHz). Accordingly, transducers 23a–26a (may actually be more or less than four) are chosen so that the resonance frequencies of the transducers are such as to produce signals, centered about the resonance frequencies, which will effectively overlap with each other thereby providing a useful signal over a broad frequency bandwidth.

In operation, tool 10 is lowered to the bottom of the wellbore interval to be investigated and is then raised at a controlled logging speed. As the tool is raised, transducer elements 23a–26a in transmitter 15 are pulsed simultaneously and the acoustic signals therefrom are partially summed by sleeve 40, and superpose in the oil-filled space 42 and in the wellbore fluid 13 to form a composite output pressure wave. The output pressure wave excites shear waves (FIG. 4A) or compressional waves (FIG. 4B) in the formation. The respective waves travel through the formation and re-enter the wellbore liquid adjacent each receiver section 16 where the individual receiver transducers respond to the various frequency components of the returned signals. The transducers detect the returned signals, and the signals are then amplified by conventional means and are sent uphole via cable 12 to the surface where the travel times and/or amplitudes of the signals are measured, processed and recorded to form an acoustical log of the wellbore.

What is claimed is:

1. An acoustic well logging tool comprising
   a sonde comprising:
   a transmitter having a plurality of separate acoustic signal generating means, each of said acoustic signal generating means having a different resonance frequency and each of said acoustical signal generating means comprising a pair of transducer elements positioned diametrically-opposed to each other in said transmitter section, each of said pair of transducer elements having the same resonance frequency;
   means for simultaneously driving each of said plurality of signal generating means to thereby generate an individual acoustic signal from each of said plurality of signal generating means, each signal having a frequency bandwidth effectively centered about the respective resonance frequency of its respective signal generating means; and means for transmitting said plurality of individual signals as a composite output acoustical signal from said transmitter, said output signal having a broad frequency bandwidth extending over the effective range of said resonance frequencies of said plurality of signal generating means; and at least one receiver section means spaced from said transmitter for detecting said composite output signal from said transmitter section after said output signal has passed through a formation being logged by said tool.

2. The acoustic well logging tool of claim 1 wherein said each transducer element of each pair of transducer elements is positioned to generate an acoustic signal in the same direction as that of the signal generated by the other transducer of said pair.

3. The acoustic well logging tool of claim 1 wherein said each transducer element of each pair of said transducer elements is positioned to generate an acoustic signal in an opposite direction from that of the signal generated by the other transducer of said pair.

4. The acoustic well logging tool of claim 1 wherein said means for combining said plurality of signals comprises:

an elastic sleeve mounted on said transmitter section and forming a space between said sleeve and each of said pairs of transducer elements; and liquid filling said space.

5. The acoustic well logging tool of claim 1 wherein said at least one receiver section comprising:

a receiver housing;

a plurality of signal receiving means, each of said signal receiving means having the same resonance frequency as that of a respective said acoustic signal generating means.

6. The acoustic well logging tool of claim 5 wherein said receiver section includes:

an elastic sleeve positioned on said receiver housing and over said signal receiver means to form a space between said sleeve and said signal receiver means; and liquid filling said space.

7. An acoustic well logging tool comprising:

a sonde having a transmitter section and at least one receiver section; said transmitter section comprising:

a housing having a plurality of parallel horizontal passages therethrough, each passage having its ends open on diametrically-opposed sides of said housing;

a plurality of acoustical signal generating means each having a different resonance frequency, one of said plurality of acoustical signal generating means mounted in each of said passages;

means for simultaneously driving each of said acoustical frequency generating means to thereby generate a plurality of acoustical signals, each of which is effectively centered about its respective resonance frequency;

an elastic sleeve mounted on said housing over said acoustic signal generating means to thereby form a space between said sleeve and said signal generating means; and a liquid filling said space.

8. The acoustic well logging tool of claim 7 wherein said receiver section comprises:

a receiver housing having the same number of parallel horizontal passages as said transmitter;

a plurality of receiver elements, each having a resonance frequency corresponding to the resonance frequency of a respective signal generating means in said transmitter;

one of said plurality of receiver elements mounted in a respective passage in said receiver housing;

an elastic sleeve mounted on said receiver housing over said receiver elements to thereby form an space between said sleeve and said receiver elements; and liquid filling said space.

9. The acoustical well logging tool of claim 8 wherein each of said acoustical signal generating means comprises:

a pair of transducers, both having the same resonance frequency; and means for mounting said transducers in their respective passage whereby one of said transducers closes said passage adjacent one end thereof and said other of said transducers closes said passage at the other end thereof.

10. The acoustical well logging tool of claim 9 wherein each of said transducers comprises:

a circular substrate, and a circular piezoelectric element, having a diameter smaller than said circular substrate, concentrically mounted on said substrate.

11. The acoustical well logging tool of claim 10 wherein said piezoelectric element is comprised of a lead-zirconate-titanate, ferroelectric material and said substrate is comprised of brass.

12. The acoustical well logging tool of claim 10 wherein said means for mounting said each of said transducers comprises:

an annular shoulder in said passage near the end thereof;

a first annular support ring positioned on said shoulder and adapted to support one side of said substrate is supported;

a second annular support ring positioned on the other side of said substrate; and means for securing said second ring, said substrate, and said first ring in said passage.

13. The acoustic well logging tool of claim 12 wherein said securing means comprises a keeper ring threaded into said passage.

14. The acoustic well logging tool of claim 13 wherein both said shoulder and said keeper ring have sloped surfaces for receiving said first and said second rings, respectively.

15. The acoustic well logging tool of claim 14 wherein said first and said second rings are comprised of metallic material.

16. The acoustic well logging tool of claim 12 wherein both transducer elements of each pair of transducers are positioned to generate acoustic signals in the same direction.

17. The acoustic well logging tool of claim 12 wherein both transducers of each pair of transducers are positioned to generate acoustic signals in opposite directions.

* * * * *